Nov. 3, 1931.     T. A. EDISON     1,829,856
DYNAMO ELECTRIC MACHINE
Filed Dec. 15, 1928
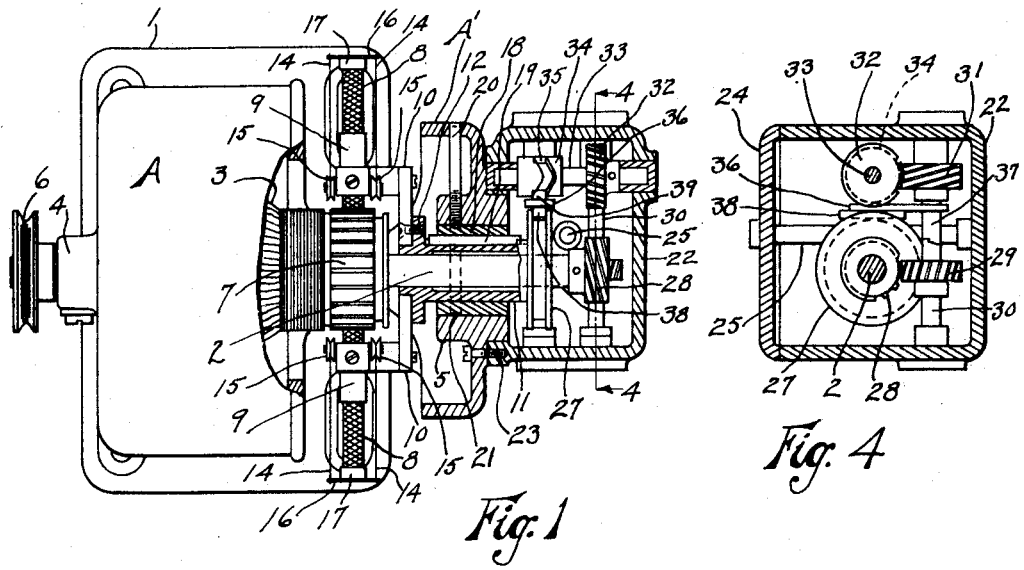
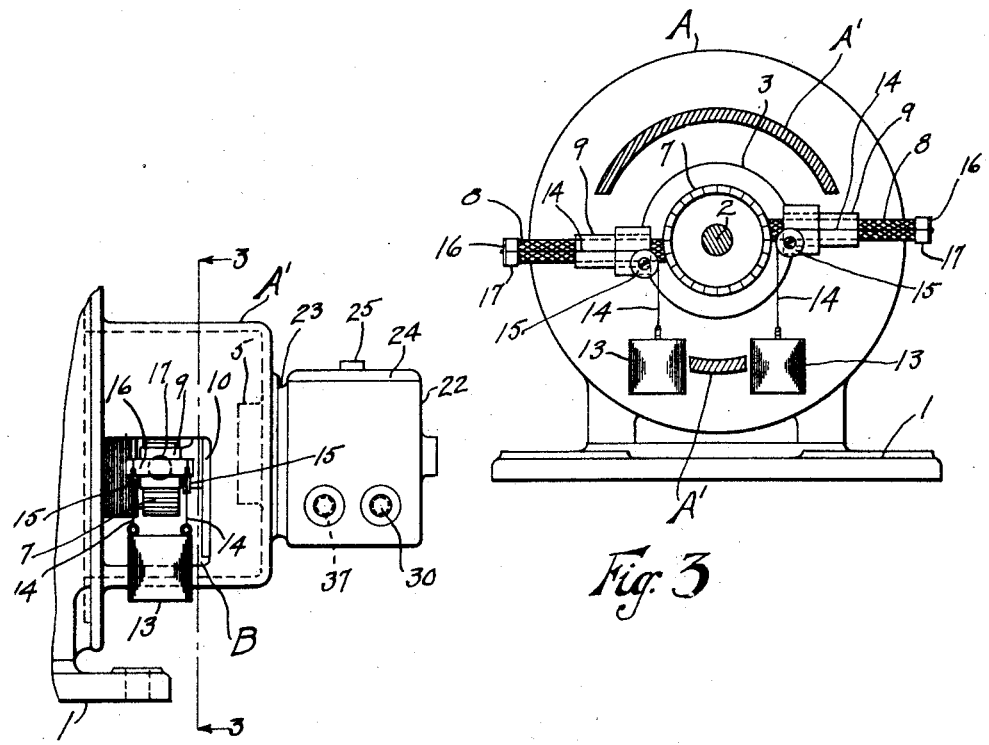
INVENTOR
Thomas A. Edison
BY
Henry Lanahan
ATTORNEY Patented Nov. 3, 1931

1,829,856

UNITED STATES PATENT OFFICE

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY

DYNAMO-ELECTRIC MACHINE

Application filed December 15, 1928. Serial No. 326,197.

My invention relates to dynamo-electric machines, and while in no wise so limited in its application, my invention is especially adapted for embodiment in electric motors and generators of small size.

When a dynamo-electric machine in which the brushes are fixed in position axially of the commutator is operated for a considerable length of time, the contact of the brushes with the commutator results in the formation of grooves and very uneven surfaces both on the brushes and on the commutator, so that the amount of surface contact therebetween becomes much reduced. This poor surface contact not only causes sparking, but greatly increases the friction, and after the contacting parts have become uneven to a slight degree the tendency to further grooving and wearing is greatly increased. While metal brushes especially those formed of copper, are superior in several respects to carbon brushes, the latter have come into quite general use largely because the wearing and grooving referred to, especially in the case of the commutator, are then much less.

One of the principal features of my invention is to overcome the foregoing objections by the provision in a machine such as described, of a novel arrangement for effecting, in the operation of the machine, relative reciprocatory movements of the commutator and the brushes of such character and extent that the brushes traverse the surface of the commutator for its entire width, first in one direction and then the other. While either the commutator or the brushes may be thus reciprocated, I find that better results are obtained by moving the brushes back and forth across the commutator, and my invention preferably includes an improved construction for so moving the brushes and which preferably also permits or provides for angular adjustment of the brushes with respect to the commutator.

Another object of my invention is to insure proper lubrication of the principal parts of the mechanism or means for effecting the said relative reciprocatory movement of the brushes and commutator, preferably by an arrangement including a lubricant-tight casing within which said parts are enclosed.

A further object of my invention is to provide an improved construction and arrangement for constantly maintaining the brushes in engagement with the commutator under a uniform pressure, regardless of the length or worn condition of the brushes.

Other objects and features of my invention will be hereinafter more specifically described and claimed.

In order that my invention may be more clearly understood, attention is directed to the drawings accompanying and forming part of this specification, and in which:

Figure 1 is a plan view, partly broken away and partly in section, of an electric motor embodying a preferred form of my invention;

Fig. 2 is a fragmental view in front elevation of the motor shown in Fig. 1;

Fig. 3 is a sectional view taken on line 3—3 of Fig. 2; and

Fig. 4 is a sectional view, with parts shown in elevation, taken on line 4—4 of Fig. 1.

Referring to the drawings, reference character 1 represents the base of the motor, A the main part of the motor casing, and A' an extension of such motor casing having oppositely disposed openings B therein. The motor shaft 2 carrying the armature 3, is mounted in aligned bearing boxes 4 and 5 respectively provided on the motor casing A and its extension A'. A suitable driving member such as the pulley 6 is secured to the end portion of the motor shaft 2 which extends from the bearing box 4, whereby power may be taken from the motor. A segmental commutator 7 is suitably secured to the armature or motor shaft 2 adjacent the right hand end of the armature 3, and brushes 8, 8 engaging the commutator 7 are slidably mounted in suitable holders 9, 9. The brushes and brush holders 8 and 9 are substantially diametrically disposed with respect to the commutator 7 and are carried by a support preferably comprising a disc 10 of suitable insulating material, such as "bakelite delicto" and a sleeve or sleeve portion 11 which is slidably mounted on the shaft 2 and to the left hand end of which the disc 10 is suitably secured as by means of screws 12 extending through the disc and threaded into a collar provided on the sleeve.

The brushes 8 and their holders 9 extend outwardly through the openings or cutaway portions B in the extension A' of the motor casing. Each of the brushes 8 is maintained constantly in engagement with the commutator under a uniform pressure regardless of the degree to which the brush is worn away and so long as the same is of usable length, by gravity means preferably comprising a weight 13, such weight being attached at opposite points to the depending end portions of a pair of cords or other flexible members 14, which pass over suitable guides, such as the two pulleys 15, respectively mounted on opposite sides of the respective brush holder 9 at the inner end of the latter, and which extend from said pulleys in parallel relation longitudinally of the brush 8 and are secured at their outer ends to the ends of a horizontal member or bar 16 having affixed thereto a cap 17 which takes over the outer end of the brush 8.

It will be apparent that the support for the brush holders and brushes is mounted so as to be capable of reciprocatory movement axially of the shaft 2 by reason of the portion 11 thereof being sleeved on said shaft. The sleeve portion 11 extends through a tubular bushing or mounting 18 and has a splined connection 19 therewith which prevents angular movement of the brush holder support with respect to said bushing, but permits movement of said support axially of the bushing. Normally, the bushing 18 and thereby the brush holder support, brush holders and brushes are held against angular movement with respect to the shaft 2 and commutator 7 by means of a set screw 20 threaded through the bearing box 5 and engaging an annular groove 21 formed in the periphery of bushing 18. Loosening of the set screw 20 permits the brush holder support, brush holders and brushes to be adjusted angularly with respect to the commutator, and tightening thereof effects the locking of said members in adjusted position; the head of the set screw being disposed in an opening in the main portion of the extension A' of the motor casing so as to be readily accessible.

The bearing box 5 consists of an enlargement or hub provided at the center of the end wall of the extension A' of the motor casing; and mounted on the outer end portion of this hub in liquid tight relation thereto, is a casing 22. The casing 22 is secured to the bearing box 5 by one or more screws 23, and has a removable cover 24 which is normally secured in place by a bolt 25 extending through the cover and threaded into a suitable lug provided on the bottom of the casing. The end portion of sleeve 11 of the brush holder support extends from the bearing box 5 into the casing 22, and secured to such extending end portion is a collar 27 having an annular peripheral groove. The shaft 2 extends outwardly from the sleeve portion 11 of the brush holder support into casing 22 and has a worm 28 secured to its outer end. The worm 28 engages a worm gear 29 carried by a shaft 30 which is disposed at right angles to the shaft 2 and is mounted in bearings provided on the opposite side walls of casing 22; and a second worm 31 secured to the shaft 30, engages a worm gear 32 secured to a shaft 33 which is mounted in bearings provided on the opposite end walls of the casing 22 and in parallel relation to the shaft 2. Character 34 represents a cylindrical member which is secured to the shaft 33 and is provided with an annular cam slot 35. An arm or member 36 is pivotally mounted within the casing 22 for rocking movement by having its lower end secured to the shaft 37 which is mounted in bearings provided in opposite side walls of casing 22 and in parallel relation to the shaft 30. At its upper end the arm 36 is provided with oppositely extending projections in the form of shoes or tongues 38 and 39 which respectively engage the annular groove in collar 27 and the cam slot 35 in member 34. The worms and worm gears 28, 29, 31 and 32 and the shafts carrying the same comprise a reduction gearing through which the armature shaft 2 drives the shaft 33 and the cam member 34 mounted thereon at a greatly reduced speed, the reduction preferably being about 400 to 1. As the cam member 34 is thus slowly rotated, the arm 36 by reason of the engagement of its projections or shoes 39 and 38 with the cam slot 35 and the groove in collar 27 respectively, is given a slow rocking movement about the axis of the shaft 37 and slowly reciprocates the brush holder support, brush holders and brushes axially of the shaft 2 so as to move the brushes back and forth across the surface of the commutator 7. The parts are so designed that the movement thus imparted to the brushes 8 is just sufficient to cause the latter to traverse the surface of the commutator for its entire width, first in one direction and then in the other.

In the operation of the machine constructed as described, the contacting surfaces of the brushes 8 and commutator 7 will be kept in a bright, smooth condition, and whatever wear takes place will be evenly distributed over each of such surfaces. As a matter of fact, the wear on both the commutator and the brushes is almost negligible, especially where the latter are constructed of the materials and in the manner hereinafter described. The commutator 7 is preferably formed of phosphor-bronze and the brushes 8 of copper. While good results are obtained with brushes which are each formed of a single solid piece of copper, I find that far better results are obtained where the brushes each consists of fine mesh copper screen wound on itself and compacted under great pressure into a solid coherent mass.

In the arrangement described the principal parts of the mechanism for effecting reciprocatory movement of the brush holders and brushes, and the support therefor, such parts comprising the collar 27, the cam member 34, the arm 36 carrying the shoes 38 and 39 and the reduction gear between the shafts 2 and 33, are enclosed in the lubricant tight casing 22. This casing 22 is practically filled with a suitable lubricant and proper lubrication of the parts referred to is thus insured for an almost indefinite period.

While I have shown and specifically described herein a preferred embodiment of my invention, it is to be understood that the same is subject to numerous changes and modifications without departure from the spirit of my invention or the scope of the appended claims.

Having now fully described my invention, what I claim as new and desire to protect by Letters Patent is as follows:

1. In a dynamo-electric machine, an armature shaft carrying a commutator, a support for the commutator brushes in sleeved relation to said shaft, and means for reciprocating said support to cause the brushes to move back and forth over said commutator comprising a collar fixed to said support, a pivoted arm having a groove and tongue engagement with said collar, and provided with a shoe, a rotatable member having an annular cam with which said shoe engages and means operable by said shaft for rotating said member, substantially as described.

2. In a dynamo-electric machine, a shaft carrying a commutator, the casing of the machine having a bearing box through which said shaft extends, brushes coacting with the commutator, a support for said brushes having a sleeve portion extending into said bearing box and through which said shaft extends, a bushing or mounting disposed in said bearing box about said sleeve portion and with which the latter has a splined connection, said bushing being adjustable angularly in said box to thereby effect angular adjustment of said support and brushes with respect to the commutator, means for locking the bushing, support and brushes in adjusted position, and means operable by said shaft and having connection with said support permitting turning movement of the support with respect thereto, for reciprocating such support to thereby cause said brushes to move back and forth over said commutator, substantially as described.

3. In a dynamo-electric machine, a shaft member carrying a commutator, brushes coacting with said commutator, a supporting member for said brushes, said members being arranged for relative reciprocatory movement in a direction axially of the shaft member so as to effect relative back and forth or traversing movement of said brushes and the commutator face, and means for effecting such relative reciprocatory movement of said members comprising a collar fixed to one of said members, a pivoted arm having a groove and tongue engagement with said collar, a rotatable member having an annular cam engaged by said arm, and means operable by said shaft member for driving said rotatable member, substantially as described.

4. In a dynamo-electric machine, a shaft member carrying a commutator, brushes coacting with said commutator, a supporting member for said brushes, said members being arranged for relative reciprocatory movement in a direction axially of the shaft member so as to effect relative back and forth or traversing movement of said brushes and the commutator face, and means for effecting such relative reciprocatory movement of said members comprising a collar fixed to one of said members, a pivoted arm having a groove and tongue engagement with said collar, a rotatable member having an annular cam engaged by said arm, and means including reducing gearing operable by said shaft member for driving said rotatable member, substantially as described.

5. In a dynamo-electric machine, a shaft member carrying a commutator, brushes coacting with said commutator, a supporting member for said brushes, said members being arranged for relative reciprocatory movement in a direction axially of the shaft member so as to effect relative back and forth or traversing movement of said brushes and the commutator face, and means for effecting such relative reciprocatory movement of said members comprising a collar fixed to one of said members, a pivoted arm having a groove and tongue engagement with said collar, a rotatable member having an annular cam engaged by said arm, means operable by said shaft member for driving said rotatable member, and a substantially lubricant-tight casing enclosing said collar, arm, rotatable member and driving means, substantially as described.

This specification signed this 13th day of December, 1928.

THOS. A. EDISON.